(12) United States Patent
Sekine et al.

(10) Patent No.: US 11,820,086 B2
(45) Date of Patent: Nov. 21, 2023

(54) PREFORM SHAPING METHOD AND COMPOSITE FORMING METHOD

(71) Applicant: SUBARU CORPORATION, Tokyo (JP)

(72) Inventors: Naoyuki Sekine, Tokyo (JP); Yuta Inoue, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 1023 days.

(21) Appl. No.: 16/420,682

(22) Filed: May 23, 2019

(65) Prior Publication Data

US 2020/0086589 A1  Mar. 19, 2020

(30) Foreign Application Priority Data

Sep. 14, 2018  (JP) .................................. 2018-173065

(51) Int. Cl.
*B29C 70/34* (2006.01)
*B29C 70/48* (2006.01)
(Continued)

(52) U.S. Cl.
CPC .............. *B29C 70/34* (2013.01); *B29C 70/48* (2013.01); *B29D 99/0003* (2013.01); *B29K 2101/12* (2013.01); *B29K 2105/0881* (2013.01)

(58) Field of Classification Search
CPC ................................ B29C 70/34; B29C 70/48
See application file for complete search history.

(56) References Cited

U.S. PATENT DOCUMENTS

| 4,762,740 A | 8/1988 | Johnson et al. |
| 8,993,084 B2 | 3/2015 | Griess et al. |

(Continued)

FOREIGN PATENT DOCUMENTS

| EP | 2 639 047 A1 | 9/2013 |
| EP | 2 805 802 A1 | 11/2014 |

(Continued)

OTHER PUBLICATIONS

Sozer, E.M., Simacek, P. and Advani, S.G., 2012. Resin transfer molding (RTM) in polymer matrix composites. In Manufacturing techniques for polymer matrix composites (PMCs) (pp. 245-309). Woodhead Publishing. (Year: 2012).*

(Continued)

*Primary Examiner* — Nicholas R Krasnow
(74) *Attorney, Agent, or Firm* — MCGINN I.P. LAW GROUP, PLLC

(57) ABSTRACT

In a preform shaping method, a fiber stack that has a plurality of fiber layers by stacking sheet-form fibrous components is manufactured and a preform that has a configuration in which a first surface and a second surface one or both of which are curved surfaces are coupled is manufactured by bending the sheet-form fibrous components after or while stacking the sheet-form fibrous components. A first sheet-form fibrous component and a second sheet-form fibrous component fiber length directions of which are set to such different directions before a bending process as to be target fiber length directions after the bending process and which form the first surface and the second surface, respectively, after the bending process are disposed in order to form at least one fiber layer of the plurality of fiber layers.

8 Claims, 9 Drawing Sheets

(51) Int. Cl.
  *B29D 99/00* (2010.01)
  *B29K 101/12* (2006.01)
  *B29K 105/08* (2006.01)

(56) References Cited

U.S. PATENT DOCUMENTS

| | | | |
|---|---|---|---|
| 2003/0132543 | A1 | 7/2003 | Gardner |
| 2004/0134593 | A1 | 7/2004 | Ishibashi et al. |
| 2005/0042410 | A1 | 2/2005 | Sakonjo et al. |
| 2006/0048890 | A1 | 3/2006 | Sato et al. |
| 2010/0285265 | A1 | 11/2010 | Shinoda et al. |
| 2010/0316837 | A1* | 12/2010 | Packer ............ B29C 53/063 156/196 |
| 2011/0086199 | A1 | 4/2011 | Duqueine et al. |
| 2011/0104432 | A1 | 5/2011 | Duqueine et al. |
| 2011/0121487 | A1 | 5/2011 | Topping et al. |
| 2013/0233474 | A1 | 9/2013 | De Mattia |
| 2014/0147620 | A1 | 5/2014 | Li et al. |
| 2015/0377217 | A1 | 12/2015 | Sandercock et al. |
| 2016/0355962 | A1 | 12/2016 | Adolphs et al. |
| 2019/0176412 | A1 | 6/2019 | Maeda et al. |

FOREIGN PATENT DOCUMENTS

| | | |
|---|---|---|
| EP | 3 023 241 A1 | 5/2016 |
| FR | 2 928 294 A1 | 9/2009 |
| JP | 2004-276393 A | 10/2004 |
| JP | 2005-153680 A | 6/2005 |
| JP | 2006-069166 A | 3/2006 |
| JP | 2007-260925 A | 10/2007 |
| JP | 2009-166279 A | 7/2009 |
| JP | 2009-191092 A | 8/2009 |
| JP | 2010-150685 A | 7/2010 |
| JP | 4965296 B2 | 7/2012 |
| WO | WO 2005/071152 A1 | 8/2005 |
| WO | WO 2015/156861 A2 | 10/2015 |

OTHER PUBLICATIONS

United States Office Action dated Sep. 27, 2021, in U.S. Appl. No. 16/420,641.
Extended European Search Report dated Jan. 2, 2020 for European Patent Application No. 19176335.8-1019.
United States Office Action dated Mar. 25, 2021, in U.S. Appl. No. 16/420,641.
United States Office Action dated Dec. 17, 2021 in U.S. Appl. No. 16/420,641.
Extended European Search Report dated Jan. 2, 2020 for European Patent Application No. 19176101.4-1019.
Japanese Office Action, dated May 31, 2022, in Japanese Application No. 2018-173065 and English Translation thereof.
United States Office Action dated Jun. 21, 2022, in U.S. Appl. No. 16/420,641.
United States Office Action dated Dec. 28, 2022, in U.S. Appl. No. 16/420,641.
United States Office Action dated Apr. 25, 2023, in U.S. Appl. No. 16/420,641.
English Translation of Collart (FR3022177) (Year: 2014).
United States Notice of Allowance dated Sep. 11, 2023, in U.S. Appl. No. 16/420,641.

* cited by examiner

→ L0

→ L0

PREFORM SHAPING METHOD AND COMPOSITE FORMING METHOD

CROSS REFERENCES TO RELATED APPLICATIONS

The present application claims priority from Japanese Patent Application No. 2018-173065 filed on Sep. 14, 2018, the entire contents of which are hereby incorporated by reference.

BACKGROUND

1. Technical Field

The disclosure relates to a preform shaping method and a composite forming method.

2. Related Art

An RTM (resin transfer molding) method has been known as one of composite forming methods for composites whose resin components have been reinforced with fibers, such as glass fiber reinforced plastics (GFRPs) and carbon fiber reinforced plastics (CFRPs).

The RTM method is a molding method for a composite in which sheet-form fibrous components are stacked, the stack is impregnated with a thermosetting resin, and then the resin is thermally cured. Of various RTM methods, a method in which fiber is impregnated with resin by vacuuming is called a vacuum-assisted resin transfer molding (VaRTM) method and a method in which impregnation with resin is carried out by using a die is called a matched-die RTM method.

SUMMARY

An aspect of the disclosure provides a preform shaping method. The method includes manufacturing a fiber stack that has a plurality of fiber layers by stacking sheet-form fibrous components, and manufacturing a preform that has a configuration in which a first surface and a second surface one or both of which are curved surfaces are coupled, by bending the sheet-form fibrous components after or while stacking the sheet-form fibrous components. The sheet-form fibrous components includes a first sheet-form fibrous component and a second sheet-form fibrous component fiber length directions of which are set to such different directions before a bending process as to be target fiber length directions after the bending process and which form the first surface and the second surface, respectively, after the bending process. The first sheet-form fibrous component and the second sheet-form fibrous component are disposed in order to form at least one fiber layer of the plurality of fiber layers.

An aspect of the disclosure provides a composite forming method including manufacturing a composite by impregnating the preform manufactured by the foregoing preform shaping method with a resin and curing the resin.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
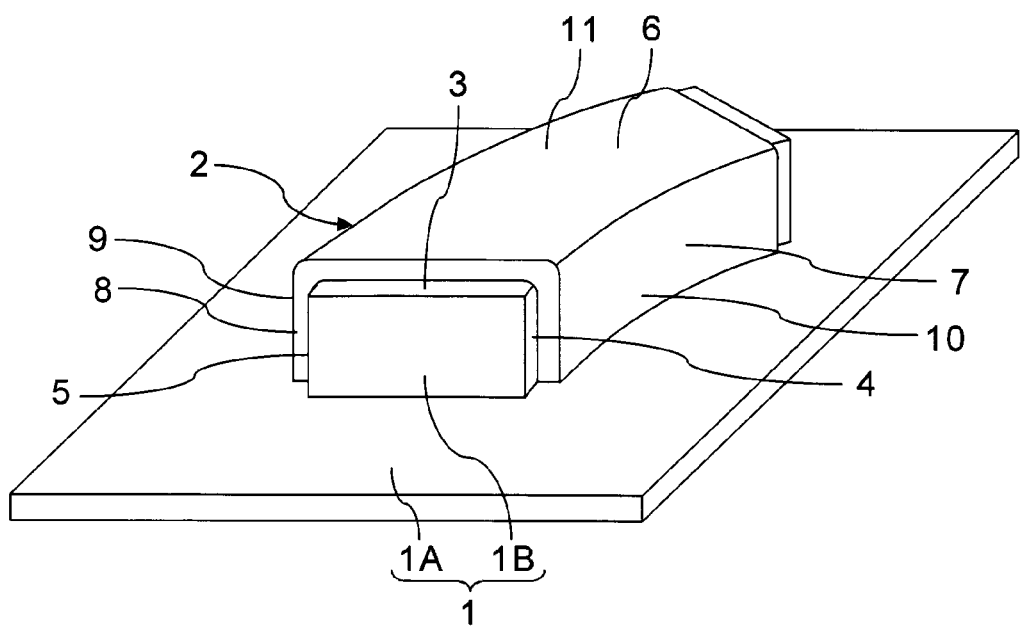
FIG. 1 is a perspective view illustrating an example of the configuration of a preform that can be manufactured by a preform shaping method according to a first embodiment of the disclosure.

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

Preform shaping methods and composite forming methods according to embodiments of the disclosure will be described with reference to the accompanying drawings.

In the case where a composite is molded by the RTM method, a dry preform is manufactured prior to resin impregnation (see, for example, Japanese Unexamined Patent Application Publication Nos. 2010-150685, 2004-

276393, and 2006-069166). The dry preform is a material obtained by shaping a stack of sheet-form fibrous components in accordance with the configuration of a composite that has been molded. A tape-form fibrous base material for use in manufacturing a dry preform is called a dry tape material. Techniques for manufacturing a dry preform by using a dry tape material include a technique in which after dry tape materials are stacked on a flat planar stacking jig, the dry tape material stack is shaped into a product configuration by placing the stack on a die and pressing the stack against the die while heating.

However, in some cases, pressing a dry tape material stack curves the orientation of fiber in accordance with the configuration of the stack that is assumed due to the shaping (i.e., the shaped configuration of the stack) and therefore makes it difficult to align the fiber to an optimum design orientation.

Therefore, it is desirable to allow the fiber orientation to be made better after a dry preform for a composite has been shaped.

First Embodiment

FIG. 1 is a perspective view illustrating an example of the configuration of a preform that can be manufactured by a preform shaping method according to a first embodiment of the disclosure.

Using a shaping mold 1 having a rigid body that has a plurality of shaping surfaces that include curved surfaces as illustrated as an example in FIG. 1, a platy preform 2 having a bent or folded configuration can be shaped. The preform 2 is a raw material for a fiber reinforced plastic (FRP) obtained by reinforcing resin with fiber such as CFRPs and GFRPs. The FRP is also called a composite.

Incidentally, a shaped stack of a plurality of sheet-form fibrous components that has been subjected to shaping but not been impregnated with resin yet is called a dry preform to distinguish it from a shaped stack of a plurality of sheet-form fibrous components that has been impregnated with resin. Furthermore, as a raw material for manufacturing a dry preform, a tape-form fibrous material is commercially sold under the name of the dry tape material.

In the example illustrated in FIG. 1, the shaping mold 1 has a configuration made up of a flat plate 1A and a protrusion 1B formed thereon. The protrusion 1B has a configuration obtained by radially cutting a donut configuration whose cross section is rectangular. An upper flat surface of the protrusion 1B of the shaping mold 1 forms a first shaping surface 3, a radially inner side surface of the protrusion 1B, that is, a concavely curved surface thereof, forms a second shaping surface 4, and a radially outer side surface of the protrusion 1B, that is, a convexly curved surface thereof, forms a third shaping surface 5.

Therefore, by using the shaping mold 1, a preform 2 having a configuration formed by a planar web 6 that has on its same surface an curved inner side flange 7 and a curved outer side flange 8 can be manufactured. More concretely, a preform 2 having a platy elongated structure that has a surface configuration in which a curved surface 9 that is convex when viewed from the side of a mountain fold and a curved surface 10 that is concave when viewed from a mountain fold side are interconnected by a flat surface 11.

Of course, edges of the protrusion 1B of the shaping mold 1 may be formed as blunted edges, for example, rounded edges or chamfered edges, so that joining portions of the web 6 with the inner side flange 7 and the outer side flange 8 are provided with blunted corners, for example s, rounded corners or chamfered corners.

When a preform 2 having a configuration in which a first surface and a second surface one or both of which are curved surfaces, such as a configuration in which the flat platy web 6 and the curved platy flanges 7 and 8 are coupled as illustrated as an example in FIG. 1, is to be manufactured, the preform 2 can be manufactured by a preform shaping method that includes the step of manufacturing a fiber stack that has a plurality of fiber layers by stacking sheet-form fibrous components that have yet to be impregnated with resin and the step of manufacturing the preform 2 that has a configuration in which a first surface and a second surface one or both of which are curved surfaces are coupled together, by bending the sheet-form fibrous components while or after stacking the sheet-form fibrous components.

Incidentally, in the shaping step that includes bending the sheet-form fibrous components, a sheet-form fibrous component that, after the bending process, forms a curved surface may be bent while fiber of the sheet-form fibrous components is being spread. As a concrete example, the sheet-form fibrous components that form the curved platy flanges 7 and 8 may be shaped while being spread to some extent.

Figure 2A:
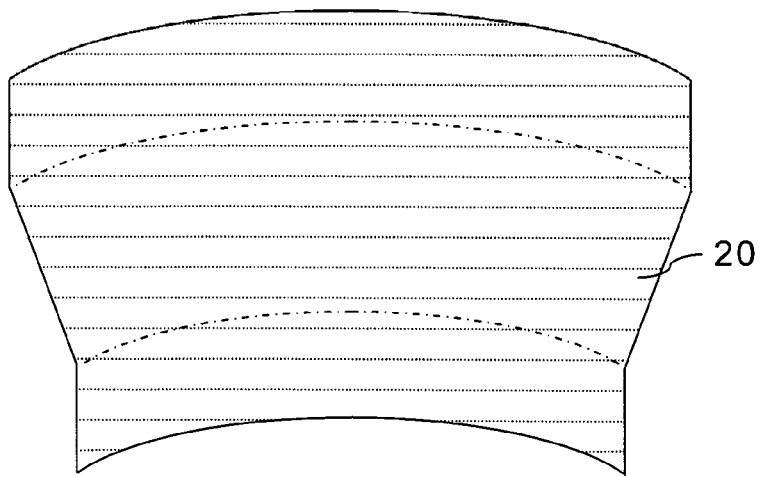
FIGS. 2A and 2B are diagrams for describing a problem that occurs when a preform illustrated in FIG. 1 is manufacture by a related-art preform shaping method.
Figure 2A:
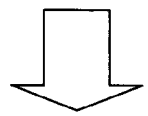
Figure 2B:
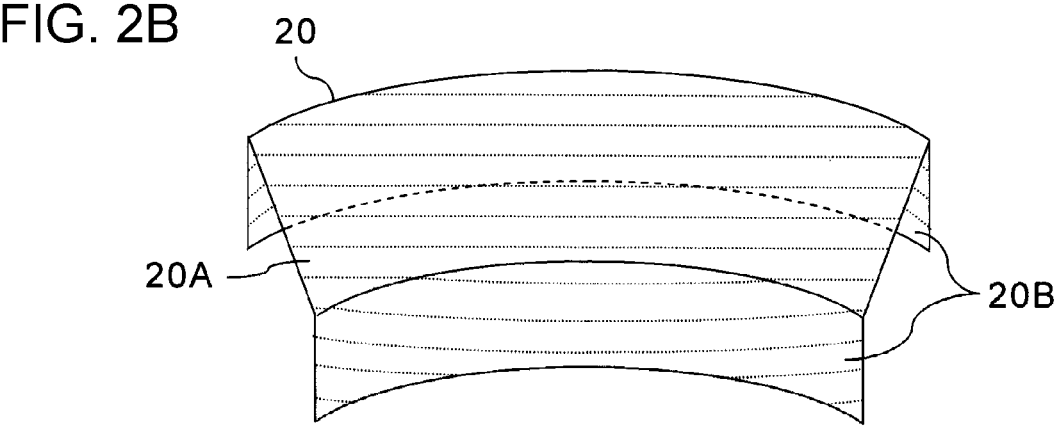

FIGS. 2A and 2B are diagrams for describing a problem that occurs when the preform 2 illustrated in FIG. 1 is manufactured by a related-art preform shaping method.

Flat sheet-form fibrous components 20 whose fiber orientation angle is constant as illustrated in FIG. 2A can be stacked and bent as illustrated in FIG. 2B. In this process, the orientation angle of fiber does not change in a portion 20A that forms the flat web 6 whereas, in portions 20B that form the curved flanges 7 and 8, fiber curves and therefore the fiber orientation angle changes. As a result, the post-shaping orientation angle of fiber does not equal a target orientation angle, which leads to decreases in the strength and rigidity of the composite.

To avoid this, the orientation of fiber of a sheet-form fibrous component prior to bending the sheet-form fibrous component can be set so that the orientation of fiber after the fibrous component is bent equals an ideal orientation. In this case, combination of a plurality of sheet-form fibrous components different from each other in the orientation of fiber can form a single fiber layer.

Figure 3A:
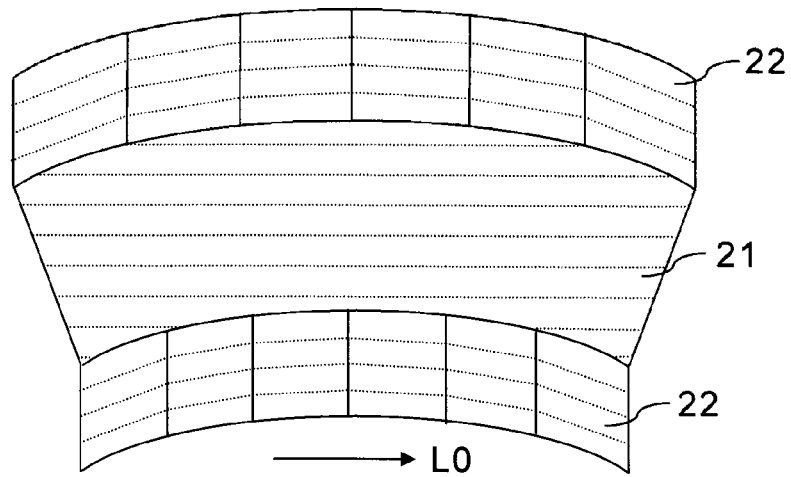
FIGS. 3A and 3B are diagrams illustrating a preform shaping method according to the first embodiment of the disclosure.
Figure 3A:
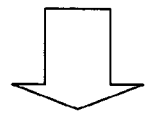
Figure 3B:
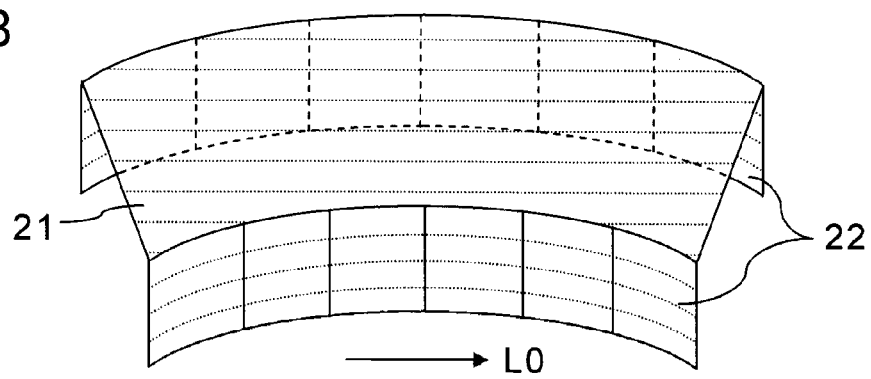

FIGS. 3A and 3B illustrate a preform shaping method according to the first embodiment of the disclosure.

As illustrated in FIG. 3A, in order to form at least one fiber layer of a plurality of fiber layers that constitute a preform 2, a flat first sheet-form fibrous component 21 that forms a flat first surface, such as the flat web 6, after bending and flat second sheet-form fibrous components 22 that form second surfaces, such as the curved flanges 7 and 8, after bending can be disposed. The first sheet-form fibrous component 21 and the second sheet-form fibrous components 22 are set to have such mutually different length directions of fiber before the bending process that, after the bending process, the first sheet-form fibrous component 21 and the second sheet-form fibrous components 22 have target length directions of fiber.

For example, when a preform 2 having a configuration in which a web 6 having a flat platy configuration and curved platy flanges 7 and 8 are coupled together as illustrated in FIG. 1 is to be shaped, it is possible to form the flat platy web 6 from the first sheet-form fibrous component 21 while forming each of the curved flanges 7 and 8 from a plurality of second sheet-form fibrous components 22 disposed side by side in a length direction of a corresponding one of the flanges 7 and 8, as illustrated in FIG. 3B.

Furthermore, the plurality of flat second sheet-form fibrous components 22 can be set to have mutually different linear length directions of fiber before bending as illustrated in FIG. 3A so that, after the bending process, a direction that represents the fiber length directions of the second sheet-form fibrous components 22 that form the curved flanges 7 and 8, that is, the fiber orientation of the plurality of second sheet-form fibrous components 22, becomes close to the fiber orientation of the first sheet-form fibrous component 21 that forms the flat platy web 6 as illustrated in FIG. 3B.

Specifically, although the length directions of individual fibers of sheet-form fibrous components are random, the fiber orientation that is a direction that represents the length directions of fibers can be made as uniform as possible between the plurality of second sheet-form fibrous components 22 and the first sheet-form fibrous component 21 after the bending process. Since the direction perpendicular to the first sheet-form fibrous component 21 and the directions perpendicular to the plurality of second sheet-form fibrous components 22 after bending are different from each other, making the fiber orientation substantially or approximately uniform between the first sheet-form fibrous component 21 and the plurality of second sheet-form fibrous components 22 after the bending process corresponds to changing the direction that represents the length directions of fibers of the plurality of second sheet-form fibrous components 22 to a direction that spatially corresponds to the direction that represents the length directions of fibers of the first sheet-form fibrous component 21. When the orientation of fibers is consistent, the fiber orientation can be expressed as an orientation angle.

More concretely, the first sheet-form fibrous component 21 that forms the flat platy web 6 can be set consistent in the flat state prior to bending because the bending does not change the orientation angle of fibers of the first sheet-form fibrous component 21. On the other hand, the second sheet-form fibrous components 21 that form the curved flanges 7 and 8 change the orientation angle of fibers at the time of bending. Therefore, it is desirable to set the pre-bending orientation angle of fibers of the second sheet-form fibrous components 21 so that, after bending, target orientation angles of fibers of the second sheet-form fibrous components 21 can be obtained.

As illustrated as an example in FIGS. 3A and 3B, in the case where the first sheet-form fibrous component 21 that forms the web 6 has a fiber orientation angle of 0 degree (L0), it is appropriate that the fiber length direction of the first sheet-form fibrous component 21 prior to bending be set so that, after the bending, the length direction of fibers that form the curved flanges 7 and 8 will be parallel to the flat web 6. However, as a result, ideal fiber length directions of flat sheet-form fibrous components prior to bending are along a curve, leading to increases in the production cost of sheet-form fibrous components.

Therefore, as illustrated in FIG. 3A, a plurality of second sheet-form fibrous components 22 whose fiber length directions are each set linear can be disposed in order to form the curved flanges 7 and 8. By disposing a plurality of yet-to-be-bent flat second sheet-form fibrous components 22 while gradually varying the fiber orientation angles of the second sheet-form fibrous components 22 as illustrated in FIG. 3A, a direction that represents the fiber length directions of the plurality of bent second sheet-form fibrous components 22 can be caused to be parallel to the fiber length direction of the web 6 that has a flat platy configuration as illustrated in FIG. 3B.

That is, by disposing a plurality of second sheet-form fibrous components 22 that have linear fiber length directions adjacent to each other, a curve approximation of fiber length directions can be carried out. Therefore, as illustrated as an example in FIG. 3B, a preform 2 formed by fibers that have orientation angles that are appropriate in terms of strength can be manufactured.

The fiber orientation angles of a plurality of fiber layers that constitute a typical preform 2 and a typical composite are made different from one another. In other words, by stacking a plurality of sheet-form fibrous components that are different from one another in the fiber orientation angle, a preform 2 that has fiber layers that are different from one another in the fiber orientation angle are manufactured. The orientation angle of fiber has been standardized. Sheet-form fibrous components whose orientation angles are 0 degree, ±45 degrees, and 90 degrees are often used to form stacks.

FIGS. 3A and 3B illustrate an example in which the fibers that constitute the web 6 have an orientation angle of 0 degree. Therefore, sheet-form fibrous components whose fiber orientation angles are the same or different are stacked in a thickness direction. When a sheet-form fibrous component that has a fiber orientation angle of 90 degrees is bent to form a curved surface, the fiber length direction of the fibrous component does not substantially change. Therefore, it is not altogether necessary that one fiber layer be divided into a first sheet-form fibrous component 21 and a plurality of second sheet-form fibrous components 22 in order to form the curved flanges 7 and 8 and the flat platy web 6 as illustrated as an example in FIGS. 3A and 3B. That is, a fiber layer whose fiber orientation angle is 90 degrees can be constructed by using one sheet-form fibrous component.

When sheet-form fibrous components whose orientation angle is 45 degrees are bent to form a curved surface, the fiber length directions of the fibrous components become along a curve. Therefore, it is preferable that a plurality of sheet-form fibrous components be disposed adjacent to each other so that, after being bent, the fibrous components have their fiber length directions as closely along a straight line as possible. This can apply not only in the case of fibrous components whose fiber orientation angle is 45 degrees but also in the case of fibrous components whose fiber orientation angles are other than 45 degrees.

Figure 4A:
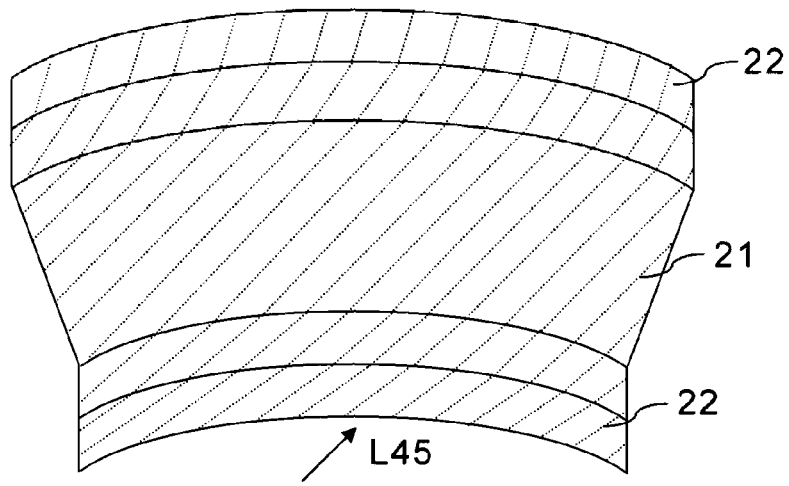
FIGS. 4A and 4B are diagrams illustrating an example of arrangement of fiber when the orientation angle of the fiber according to the disclosure is 45 degrees.
Figure 4B:
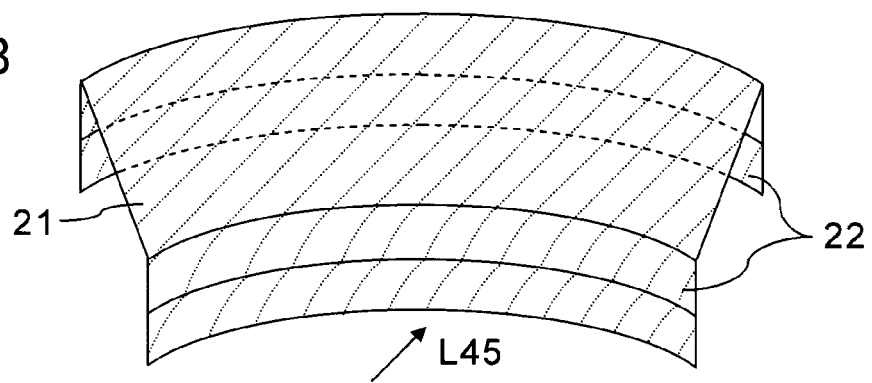

FIGS. 4A and 4B illustrate an example of fiber arrangement when the orientation angle of fiber according to an embodiment of the disclosure is 45 degrees.

As illustrated in FIGS. 4A and 4B, when the orientation angle of fibers that constitute a web 6 is 45 degrees (L45), a plurality of second sheet-form fibrous components 22 which form flanges 7 and 8 and each of which has a linear fiber orientation angle prior to bending can be disposed with their fiber orientation angles made different from each other so that, after the flanges 7 and 8 are bent, the fibers that constitute each of the flanges 7 and 8 have a fiber orientation angle that is as close to 45 degrees as possible. When the orientation angle of the fibers that constitute the web 6 is 45 degrees, it is appropriate that, as illustrated in FIG. 4A, a plurality of second sheet-form fibrous components 22 that form the flanges 7 and 8 be disposed side by side immediately adjacent to each other in a height direction of the flanges 7 and 8 in a planarly expanded form so that the fiber orientation angles of the fibrous components 22 alter gradually.

More concretely, it is appropriate that a plurality of second sheet-form fibrous components 22 which form the flanges 7 and 8 and each of which, before a bending process, is set to have a linear fiber length direction be disposed side by side so that, after the second sheet-form fibrous components 22 are bent, their fiber length directions are along a curve and the directions that represent the fiber length directions of the second sheet-form fibrous components 22 are equal to each other. Since the fiber length directions of the bent second sheet-form fibrous components 22 are along a curve, the fiber length directions of the yet-to-be-bent second sheet-form fibrous components 22 can be set, for example, so that after the second sheet-form fibrous components 22 are bent, the orientations of the straight lines passing through both ends of fibers of the second sheet-form fibrous components 22 or the orientations of the tangent lines to the fibers at the midpoints of the fibers are the second sheet-form fibrous components 22 are the same. That is, the directions that represent the fiber length directions of the second sheet-form fibrous components 22 after the bending process can be set as the orientations of straight lines passing through both ends of the fibers or of tangent lines to the fibers at the midpoints of the fibers.

When sheet-form fibrous components for forming a fiber layer as illustrated as an example in FIG. 3A or FIG. 4A are stacked, stacking the sheet-form fibrous components while tentatively fastening them with a binder leads to prevention of slip and deviation of the sheet-form fibrous components. In particular, in the case where sheet-form fibrous components different in fiber orientation angle are stacked to form a plurality of fiber layers, the position of a boundary between a plurality of sheet-form fibrous components disposed adjacent to each other to form a fiber layer as described above with reference to FIG. 3A and FIG. 4A is different between the fiber layers that are different from each other in the orientation angle.

Therefore, even when a plurality of sheet-form fibrous components are disposed adjacent to each other in order to form a fiber layer, tentatively fastening each sheet-form fibrous component to a sheet-form fibrous component that is adjacent in the stacking direction will prevent positional slip of fibers and excessive slide of fibers unnecessary for bending. In particular, since a fiber layer whose orientation angle is 90 degrees can be formed by one sheet-form fibrous component as described above, a plurality of sheet-form fibrous components that constitute another fiber layer can be prevented from having positional slip of fibers and excessive slide of fibers by tentatively fastening the fibrous components to the fiber layer the orientation angle of which is 90 degrees and which is formed by one sheet-form fibrous component.

Examples of the binder include a thermoplastic binder and a thermosetting binder. Sheet-form fibrous components to which a sheet-form, net-form, nonwoven fabric-form, or powder-form thermoplastic binder has been attached, sheet-form fibrous components to which a powder-form or liquid-state thermosetting binder has been attached, etc. have been productized.

Figure 5:
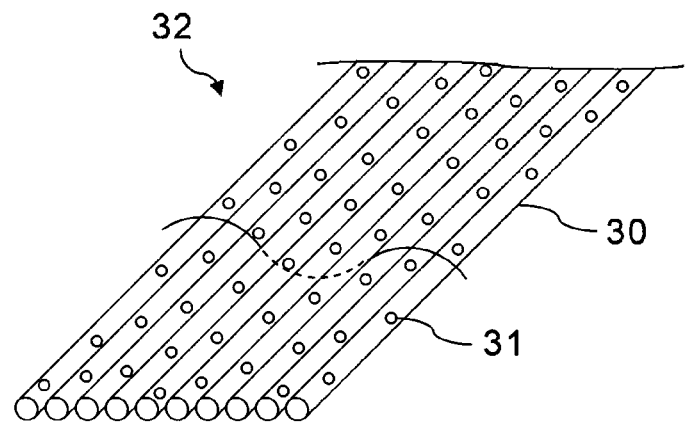
FIG. 5 is a perspective view illustrating a structure of a sheet-form fibrous component in which fine particles of a thermoplastic resin have been attached as a thermoplastic binder to fiber.

FIG. 5 is a perspective view illustrating a structure of a sheet-form fibrous component in which fine particles of a thermoplastic resin have been attached as a thermoplastic binder to the fiber.

A sheet-form fibrous component 32 in which a bundle 30 of fibers bundled in a sheet form has been coated with fine particles 31 of a thermoplastic resin as a thermoplastic binder as illustrated in FIG. 5 has been productized.

Figure 6:
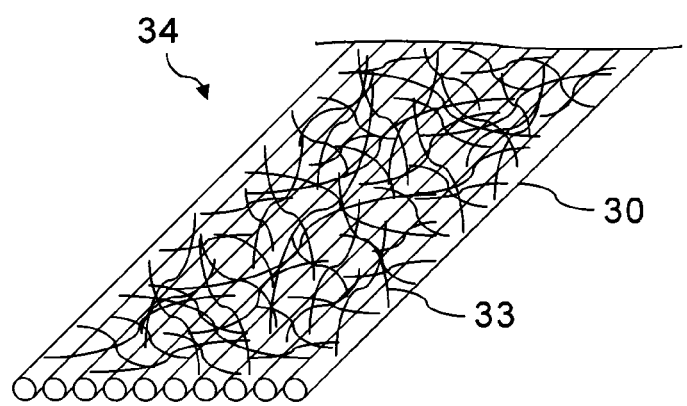
FIG. 6 is a perspective view illustrating a structure of a dry tape material in which a thermoplastic nonwoven fabric has been attached as a thermoplastic binder to fiber.

FIG. 6 is a perspective view illustrating a structure of a dry tape material in which a thermoplastic nonwoven fabric has been attached as a thermoplastic binder to fiber.

A sheet-form fibrous component 34 in which a thermoplastic nonwoven fabric 33 has been superimposed as a thermoplastic binder on a fiber bundle 30 bundled in a sheet form as illustrated in FIG. 6 has also been productized.

Therefore, sheet-form fibrous components with a desired binder attached as illustrated as examples in FIG. 5 and FIG. 6 can be stacked while the fibrous components are tentatively fastened. Of course, in the case where tentative fastening is not carried out, sheet-form fibrous components without an attached binder may be stacked.

Furthermore, an automatic fiber stacking apparatus equipped with a heater for the spot welding of a binder has been productized. Therefore, if the preform 2 is manufactured by stacking sheet-form fibrous components on a flat platy stacking jig while tentatively fastening them with a binder and by placing and bending the stack of the sheet-form fibrous components on the shaping mold 1 as illustrated as an example in FIG. 1, the stacking of fibrous components involving tentative fastening can easily be automatized. Besides, if the bending of fiber is carried out after the fiber components are stacked regardless of whether the stacking and tentative fastening of fibrous components is automatically performed or manually performed by an operator, the number of times of bending the fiber becomes one for each bend line, leading to a reduction in the amount of operation.

Figure 7:
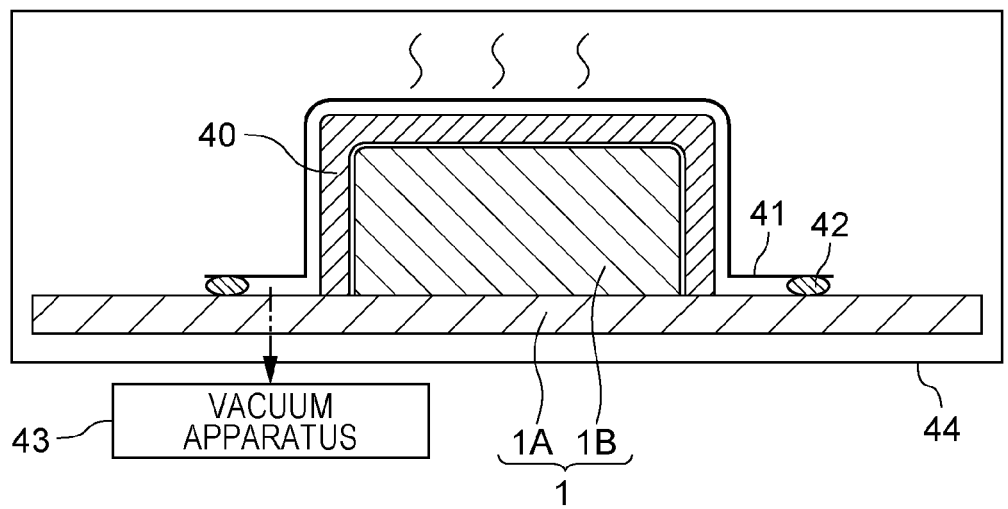
FIG. 7 is a cross-sectional view of a shaping mold as illustrated in FIG. 1, illustrating an example in which the shaping mold is used to manufacture a preform by bagging a stack of sheet-form fibrous components.

FIG. 7 is a cross-sectional view of a shaping mold 1 as illustrated in FIG. 1, illustrating an example in which the shaping mold 1 is used to manufacture a preform 2 by bagging a stack of sheet-form fibrous components.

To bag a fiber stack 40, the fiber stack 40 stacked on the protrusion 1B of the shaping mold 1 is covered with a bagging film 41 as illustrated in FIG. 7 and an edge of the bagging film 41 is stuck to the flat plate 1A of the shaping mold 1 by a sealant 42, so that the fiber stack 40 can be tightly closed.

Next, a region tightly closed by the bagging film 41 can be depressurized by a vacuum apparatus 43. The vacuum apparatus 43 may be connected by a vacuum hose to the bagging film 41 or may also be connected to the shaping mold 1. When vacuuming is performed by the vacuum apparatus 43, the fiber stack 40 is loaded with the difference pressure between the atmospheric pressure and the pressure in the region tightly closed by the bagging film 41. Specifically, the fiber stack 40 can be pressurized due to the bagging of the fiber stack 40 with the bagging film 41. Therefore, a shaped preform 2 can be obtained.

Furthermore, in the case where a preform 2 is to be shaped from a fiber stack 40 in which a thermoplastic binder has been attached, it is necessary to heat the fiber stack 40 to a temperature at which the binder melts. Therefore, for example, a heater 44 may be provided within the shaping mold 1 to be used to melt the thermoplastic binder. Of course, the fiber stack 40 that has been bagged may be sent together with the shaping mold 1 into an independent heater 44 such as an oven.

Figure 8:
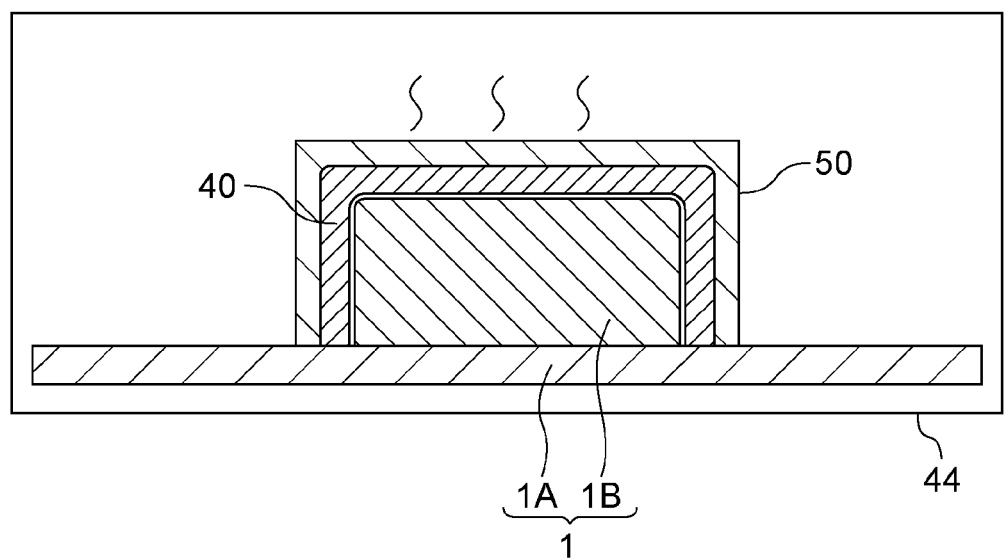
FIG. 8 is a cross-sectional view of a shaping mold as illustrated in FIG. 1 and an upper mold, illustrating an example in which a preform is manufactured by clamping a stack of fibrous components between the shaping mold and the upper mold.

FIG. 8 is a cross-sectional view of a shaping mold 1 as illustrated in FIG. 1 and an upper mold 50, illustrating an example in which a preform 2 is manufactured by clamping a stack 40 of fibrous components between the shaping mold 1 and the upper mold 50.

As illustrated in FIG. 8, a fiber stack 40 can be pressurized by clamping it between the upper mold 50 that has a recess whose configuration matches the shaped configuration of the preform 2 and the shaping mold 1 that functions as a lower mold. Therefore, the shaped preform 2 can be obtained.

Even in the case where the fiber stack 40 is clamped by the shaping mold 1 and the upper mold 50, the shaping of a preform 2 through the use of a thermoplastic binder requires that the fiber stack 40 be heated to a temperature at which the binder melts. Therefore, for example, the heater 44 may be provided within at least one of the upper mold 50 or the shaping mold 1 in order to melt the thermoplastic binder. Of course, it is also permissible that the fiber stack 40 be sent, together with the shaping mold 1 and the upper mold 50, into an independent heater 44 such as an oven.

When the preform 2 has been manufactured by the foregoing preform shaping method, a composite can be manufactured by impregnating the preform 2 with a resin and curing the resin.

Figure 9:
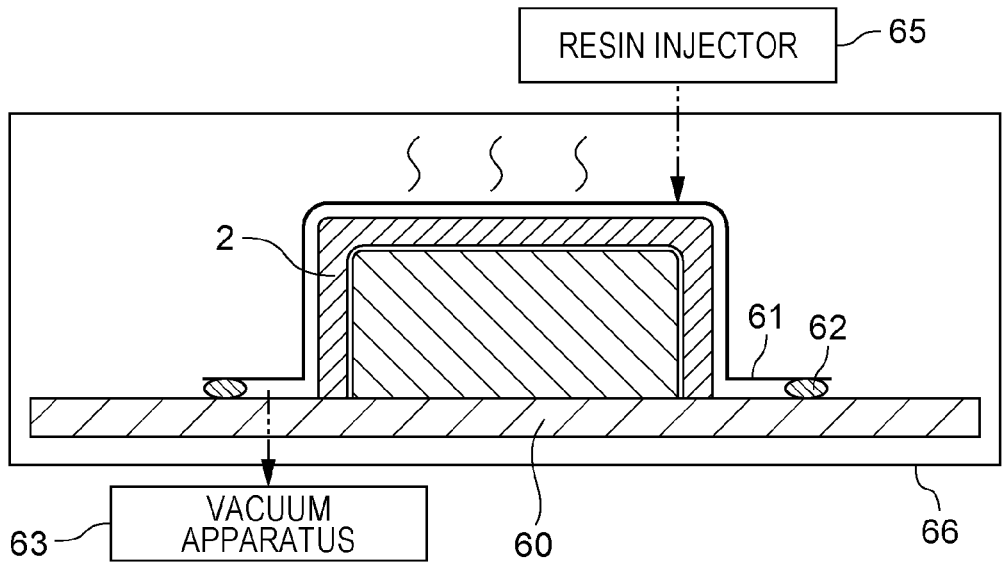
FIG. 9 is a diagram illustrating a method for molding a composite by a VaRTM method.
Figure 10:
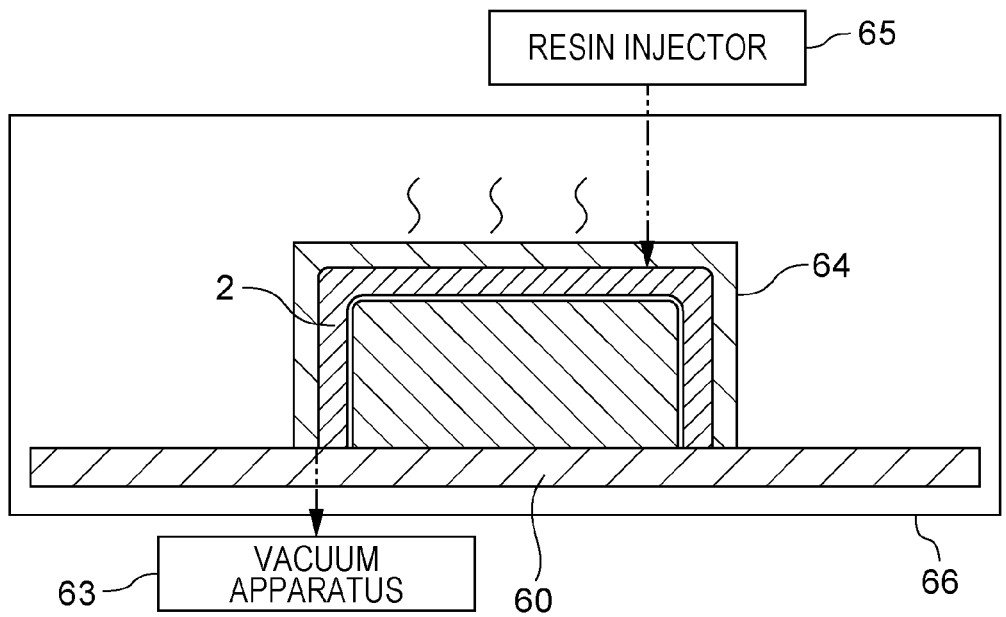
FIG. 10 is a diagram illustrating a method for molding a composite by a matched-die RTM method.

FIG. 9 illustrates a method for molding a composite by a VaRTM method. FIG. 10 illustrates a method for molding a composite by a matched-die RTM method.

When the VaRTM method is used to mold a composite, a preform 2 is mounted on a lower mold 60 for molding the composite as illustrated in FIG. 9. The lower mold 60 may be the same as the shaping mold 1 illustrated as an example in FIG. 1 or may also be another mold dedicated to molding a composite. In the case where the lower mold 60 is the same as the shaping mold 1, other apparatuses and installations can also be commonized.

After that, the preform 2 placed on the lower mold 60 is covered with a bagging film 61 and an edge of a bagging film 61 is stuck to the lower mold 60 by a sealant 62. Then, the region tightly sealed by the bagging film 61 is depressurized by a vacuum apparatus 63. Specifically, the vacuuming by the vacuum apparatus 63 carries out the bagging of the preform 2.

When the matched-die RTM method is used to mold a composite, a preform 2 is disposed in a space formed between a lower mold 60 and a upper mold 64 that are provided for molding a composite, as illustrated in FIG. 10. Then, the space formed between the lower mold 60 and the upper mold 64 is vacuumed by a vacuum apparatus 63.

After the vacuuming is completed, a resin is injected from a resin injector 65 in both the case where the bagging film 61 is used for bagging as illustrated in FIG. 9 and the case where the upper mold 64 is used as illustrated in FIG. 10. Specifically, the resin is injected from the resin injector 65 into a region covered with the bagging film 61 or a region between the lower mold 60 and the upper mold 64. Thus, the preform 2 can be impregnated with the resin.

Furthermore, the resin is heated by the resin injector 65, if necessary, so that the resin acquires a fluidity. Still further, in the case where the resin in a heated condition is injected, the resin may be heated by a heater provided within the lower mold 60 so that the temperature of the resin does not drop. In the case where a heater is provided within the lower mold 60, the lower mold 60 may be provided, for example, with a built-in piping through which a heated fluid, such as heated steam, hot air, or hot water, flows. Alternatively, an electrical heater may be provided within the lower mold 60. Furthermore, in the case where the upper mold 64 is used as illustrated in FIG. 10, the upper mold 64 may also be provided with a built-in heater.

Next, the resin with which the preform 2 is impregnated is subjected to thermal curing. Concretely, the resin is heated by the heater 66 as illustrated in FIG. 9 or 10 to a temperature at which the resin cures. The heater 66 may be the same as the heater provided within the lower mold 60 or the upper mold 64 or may also be a separate heater such as an oven, as mentioned above. When the resin is heated to the curing temperature, the resin cures, so that a molded composite is manufactured. Specifically, a composite having a web 6 and flanges 7 and 8 as illustrated as an example in FIG. 1 can be molded.

Incidentally, although the examples described above with reference to FIG. 9 and FIG. 10 are examples in which a matrix resin that forms a composite is a thermosetting resin, the matrix resin may also be a thermoplastic resin. In the case where the matrix resin is a thermoplastic resin, known production methods for a composite whose matrix resin is a thermoplastic resin can be used to manufacture a composite.

Furthermore, the methods according to embodiments of the disclosure can be used to manufacture preforms 2 and composites that vary not only in composition but also in configuration, that is, preforms 2 and composites that have any desired configurations, including not only the foregoing examples of configurations but also other configurations.

Figure 11:
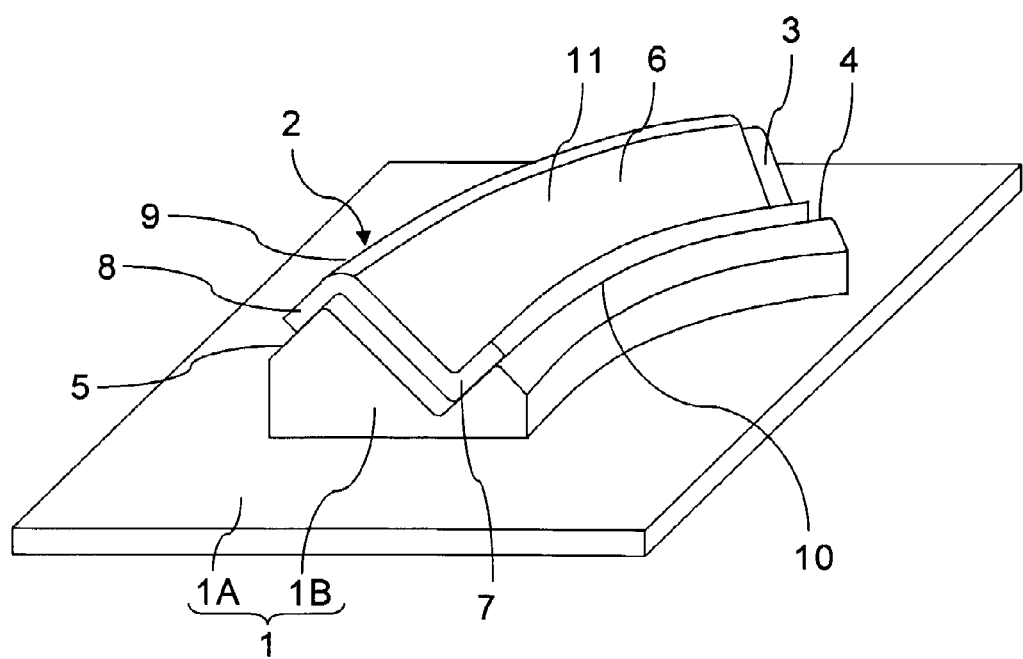
FIG. 11 is a perspective view illustrating another example of the configuration of a preform that can be manufactured by a preform shaping method according to the first embodiment of the disclosure.

FIG. 11 is a perspective view, illustrating another example of the configuration of a preform that can be manufactured by a preform shaping method according to the first embodiment of the disclosure.

As illustrated in FIG. 11, a preform 2 that has a configuration in which a planar web 6 has on one of its two surfaces a curved inner side flange 7 and on the other surface a curved outer side flange 8 can be manufactured. In other words, a preform 2 that has a curved elongated structure whose cross section has a substantially letter Z configuration. The preform 2 having this configuration, too, has a surface configuration in which a curved surface 9 that is convex when viewed from the side of a mountain fold and a curved surface 10 that is concave when viewed from a mountain fold side are interconnected by a flat surface 11.

In this case, a protrusion 1B of a shaping mold 1 that has a rigid body can be provided with a first shaping surface 3 that forms a flat surface for shaping the web 6 and with a second shaping surface 4 and a third shaping surface 5 that form convexly curved surfaces for shaping the inner side flange 7 and the outer side flange 8, respectively. Furthermore, the directions perpendicular to the first shaping surface 3, the second shaping surface 4, and the third shaping surface 5 may be oblique to the vertical direction and the horizontal direction so that a sheet-form fibrous component can be placed on the protrusion 1B while being bent.

In the preform shaping methods and the composite forming methods described above, the pre-bend fiber orientation angles of sheet-form fibrous components that are bent to form a curved surface are set so as to be ideal orientation angles after the fibrous components are bent.

Advantageous Effects

Therefore, according to the preform shaping methods and the composite forming methods described above, more appropriate fiber orientation angles can be obtained even in preforms 2 and composites that have complicated three-dimensional configurations that include the curved flanges 7 and 8 as illustrated as examples in FIG. 1 and FIG. 11. As a result, the strength and rigidity of composites can be further improved.

Second Embodiment

Figure 12A:
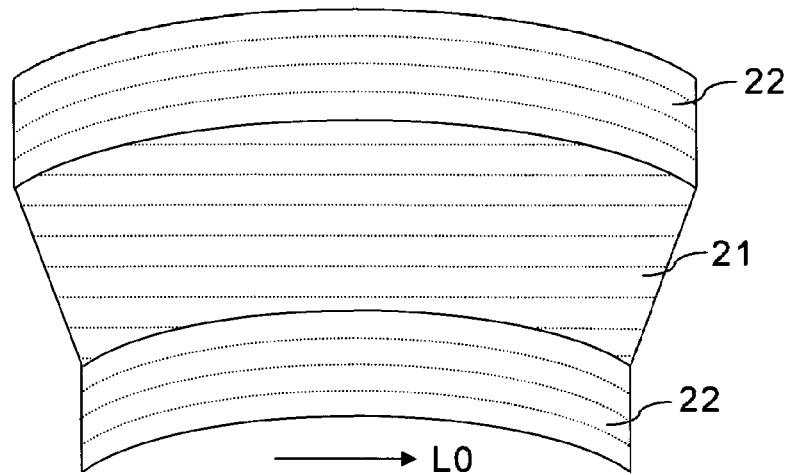
FIGS. 12A and 12B are diagrams illustrating a preform shaping method according to a second embodiment of the disclosure.
Figure 12A:
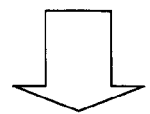
Figure 12B:
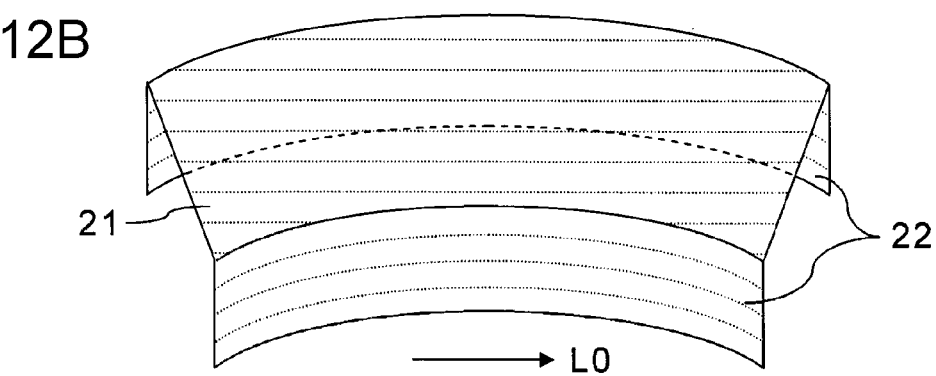

FIGS. 12A and 12B illustrate a preform shaping method according to a second embodiment of the disclosure.

The second embodiment illustrated in FIGS. 12A and 12B is different from the first embodiment in that, in the second embodiment, fiber length directions of second sheet-form fibrous components 22 that form curved surfaces are curved so that each of the second sheet-form fibrous components 22 will form a corresponding one of the curved surfaces present on one fiber layer. Other features of the second embodiment are substantially not different from those of the first embodiment. Therefore, only an example of arrangement of a first sheet-form fibrous component 21 and the second sheet-form fibrous components 22 and a configuration thereof obtained by bending are illustrated and the same components are denoted by the same characters.

As illustrated in FIG. 12A, the fiber length directions of the yet-to-be bent second sheet-form fibrous components 22 that will form the curved surfaces after being bent can be set along a curved so that, after being bent, the second sheet-form fibrous components 22 will have ideal fiber length directions. As a concrete example, in the case where a web 6 having a flat platy configuration is formed by a first sheet-form fibrous component 21 whose fiber orientation angle is zero and curved flanges 7 and 8 are formed respectively by the second sheet-form fibrous components 22 as illustrated in FIG. 12B, second sheet-form fibrous components 22 whose fiber length directions have been set along a curve as illustrated in FIG. 12A so that, after the bending process, directions that represents the fiber length directions of the second sheet-form fibrous components 22 are parallel to the flat platy web 6 can be disposed in order to form at least one fiber layer.

Of course, in the case where the fiber orientation angle is an angle other than the one indicated above, such as an angle of 45 degrees, too, second sheet-form fibrous components 22 which, before being bent, each have a representative direction of fiber orientation that is along a curve can be disposed so as to bring about a more appropriate representative direction of fibers of the second sheet-form fibrous components 22 after the second sheet-form fibrous components 22 are bent.

According to the second embodiment described above, one curved surface present on one fiber layer that constitutes a preform 2 and a composite can be formed by one second sheet-form fibrous component 22. Therefore, the amount of operation of stacking second sheet-form fibrous components 22 can be considerably reduced.

OTHER EMBODIMENTS

While specific examples of the disclosure have been described above, it is to be noted that the foregoing examples are merely illustrative and do not limit the scope of the disclosure. The novel methods and apparatuses described herein can also be embodied in various modes other than those described above. The modes of the methods and apparatuses described herein can be subject to various changes and modifications, including omissions and replacements in various manners, without departing from the gist of the disclosure. It is to be understood that what are described in the appended claims and their equivalents are encompassed in the scope and gist of the disclosure and include various modes and modifications.

The invention claimed is:

1. A preform shaping method comprising:
    manufacturing a fiber stack that includes a plurality of fiber layers by stacking sheet-form fibrous components; and
    manufacturing a preform by bending the sheet-form fibrous components after or while stacking the sheet-form fibrous components,
    wherein the preform has a configuration with a first surface and a second surface that are coupled,
    wherein one or both of the first surface and the second surface are curved surfaced,
    wherein the sheet-form fibrous components include:
        a first sheet-form fibrous component; and
        a second sheet-form fibrous component,
    wherein the first sheet-form fibrous component and the second sheet-form fibrous component are set to have mutually different length directions of fiber before the bending process that, after the bending process, the first sheet-form fibrous component and the second sheet-form fibrous components have target length directions of fiber,
    wherein the first sheet-form fibrous component and the second sheet-form fibrous component form the first surface and the second surface, respectively, after the bending process,
    wherein the first sheet-form fibrous component and the second sheet-form fibrous component are disposed adjacent to each other to form one fiber layer of the plurality of fiber layers,
    wherein, as the preform, the preform has a configuration in which a web that has a flat platy configuration and a curved platy flange are coupled is manufactured,
    wherein the web is formed by the first sheet-form fibrous component and the flange is formed by the second sheet-form fibrous component,
    wherein the second sheet-form fibrous component whose fiber length directions are set along a curve so that, after the bending process, a direction that represents the fiber length direction of the second sheet-form fibrous component that forms the flange is parallel to the web is disposed in order to form the at least one fiber layer,
    wherein the web is formed by the first sheet-form fibrous component and the flange is formed by a plurality of the second sheet-form fibrous component,
    wherein fiber length directions of each of the plurality of second sheet-form fibrous components are set linearly so that, after the bending process, a direction that represents the fiber length directions of the plurality of second sheet-form fibrous components that form the flange spatially corresponds to the direction that represents the length directions of fibers of the first sheet-form fibrous component that forms the web, and
    wherein the fiber length directions are set as mutually different directions and are disposed in order to form the at least one fiber layer.

2. The preform shaping method according to claim 1, wherein the fiber length directions of the plurality of second sheet-form fibrous components are set so that, after the bending process, the direction that represents the fiber length directions of the plurality of second sheet-form fibrous components that form the flange are parallel to the web and are disposed side by side in the fiber length direction of the flange in order to form the at least one fiber layer.

3. The preform shaping method according to claim 1, wherein the plurality of second sheet-form fibrous components the fiber length directions of which are set so that, after the bending process, the fiber lengths directions of the plurality of second sheet-form fibrous components that form the flange are along a curve and the directions that represent the fiber length directions of the plurality of second sheet-form fibrous components are the same and which are disposed side by side in a height direction of the flange are disposed in order to form the at least one fiber layer.

4. The preform shaping method according to claim 1, wherein the manufacturing the fiber stack includes:
   stacking the sheet-form fibrous components that are different in terms of the direction that represent fiber length directions.

5. The preform shaping method according to claim 1, wherein the manufacturing the fiber stack includes:
   stacking the sheet-form fibrous components while tentatively fastening the sheet-form fibrous components by a binder.

6. The preform shaping method according to claim 1, wherein the manufacturing the preform includes:
   bending the sheet-form fibrous components after stacking the sheet-form fibrous components.

7. The preform shaping method according to claim 1, wherein, after the bending of the sheet-form fibrous components during the manufacturing of the preform, the sheet-form fibrous component forms the curved surface is bent while being spread.

8. A composite forming method comprising manufacturing a preform by the preform shaping method according to claim 1; and
   manufacturing a composite by impregnating the preform with a resin and curing the resin.

* * * * *